US012794172B2

(12) United States Patent
Morello et al.

(10) Patent No.: US 12,794,172 B2
(45) Date of Patent: Nov. 10, 2026

(54) CONNECTOR ASSEMBLY AND RELATED METHODS

(71) Applicant: Aptiv Technologies AG, Schaffhausen (CH)

(72) Inventors: John Morello, Warren, OH (US); James Rainey, Warren, OH (US); William Strang, Newton Falls, OH (US); Michael J. DeMonica, Jr., Cortland, OH (US)

(73) Assignee: Aptiv Technologies AG, Schaffhausen (CH)

( * ) Notice: Subject to any disclaimer, the term of this patent is extended or adjusted under 35 U.S.C. 154(b) by 326 days.

(21) Appl. No.: 18/440,415

(22) Filed: Feb. 13, 2024

(65) Prior Publication Data

US 2025/0260195 A1 Aug. 14, 2025

(51) Int. Cl.
*H01R 13/52* (2006.01)

(52) U.S. Cl.
CPC ..... *H01R 13/5219* (2013.01); *H01R 2201/26* (2013.01)

(58) Field of Classification Search
CPC ........................ H01R 13/5219; H01R 2201/26
USPC ................................ 439/274, 275, 426, 271
See application file for complete search history.

(56) References Cited

U.S. PATENT DOCUMENTS 4,874,325 A * 10/1989 Bensing ............ H01R 13/5219 439/272
5,540,450 A * 7/1996 Hayashi ............ H01R 13/5205 174/152 G
5,607,318 A * 3/1997 Wakata ............... H01R 13/506 439/275
5,618,206 A 4/1997 Sawada
5,662,336 A * 9/1997 Hayashi ............ H01R 13/5205 439/275
6,036,541 A * 3/2000 Koumatsu ........... H01R 13/443 439/275
6,341,983 B1 * 1/2002 Crawford .......... H01R 13/5208 439/275
7,727,016 B2 * 6/2010 Lamdiziz ............ H01R 13/521 439/271
8,608,508 B2 * 12/2013 Kataoka ............ H01R 13/5208 439/589
11,349,252 B2 5/2022 Hiramatsu
2001/0016457 A1 8/2001 Taguchi
2007/0197069 A1 * 8/2007 Iwahori ............. H01R 13/5219 439/157
2012/0258623 A1 * 10/2012 Nawa .................. H01R 13/562 439/587
2020/0153152 A1 * 5/2020 Mamiya ............ H01R 13/5202
2021/0151930 A1 * 5/2021 Hiramatsu .......... H01R 13/521

OTHER PUBLICATIONS

Extended European Search Report for EP24207971.3 dated Jul. 14, 2025, 13 pages.

* cited by examiner

*Primary Examiner* — Gary F Paumen
(74) *Attorney, Agent, or Firm* — Miller Johnson

(57) ABSTRACT

A connector assembly includes a connector body and a seal. The connector body defines a cavity and a terminal slot in fluid communication with the cavity. The seal is removably disposed within the cavity. The seal includes a body defining a terminal aperture, a first rib and a second rib extending from the body, and a flap extending from the body. In an assembled configuration, the first rib and the second rib engage portions of the connector body.

18 Claims, 5 Drawing Sheets

CONNECTOR ASSEMBLY AND RELATED METHODS

FIELD

The present disclosure relates to a connector assembly and more particularly to a connector assembly that may be used in connection with vehicles.

BACKGROUND

Modern vehicles (e.g., automobiles) rely on electrical wiring and electrical connections to facilitate communication between various electronic components within the vehicle. Connection systems (e.g., connectors and terminals) play an important role in ensuring the integrity of these electrical connections and the reliability and performance of the vehicle. Some connector assemblies use connector bodies and seals to inhibit environmental conditions from degrading the electrical connection between corresponding connectors. In view of the foregoing, while known connector bodies with seals for vehicle connection systems have proven acceptable for their intended purpose, a continuous need for improvement remains in the pertinent art to adhere to the strenuous testing requirements for vehicle connections systems.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One aspect of the disclosure provides a connector assembly. The connector assembly includes a connector body and a seal. The connector body defines a cavity and a terminal slot in fluid communication with the cavity. The seal is removably disposed within the cavity. The seal includes a body defining a terminal aperture, a first rib and a second rib extending from the body, and a flap extending from the body. In an assembled configuration, the first rib and the second rib engage portions of the connector body.

Another aspect of the disclosure provides a seal for a connector assembly having a connector body. The seal includes a body, a first rib, a second rib, a first flap, and a second flap. The body defines a terminal aperture and has a first sidewall, a second sidewall opposite the first sidewall, a third sidewall extending between the first sidewall and the second sidewall, and a fourth sidewall opposite the third sidewall and extending between the first sidewall and the second sidewall. The first rib extends from the first sidewall and is configured to engage an inner portion of the connector body. The second rib extends from the first sidewall and is configured to engage the inner portion of the connector body. The first flap extends from the third sidewall and is configured to engage an outer portion of the connector body. The second flap extends from the fourth sidewall and is configured to engage the outer portion of the connector body.

Yet another aspect of the disclosure provides a method. The method includes disposing a seal in a cavity of a connector body, including engaging a first rib and a second rib of the seal with portions of the connector body, and engaging a first flap and a second flap of the seal with additional portions of the connector body. The method includes disposing a terminal in a terminal slot of the connector body and a terminal aperture of the seal. The method includes inhibiting, via the first rib, contaminants from contacting the terminal.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
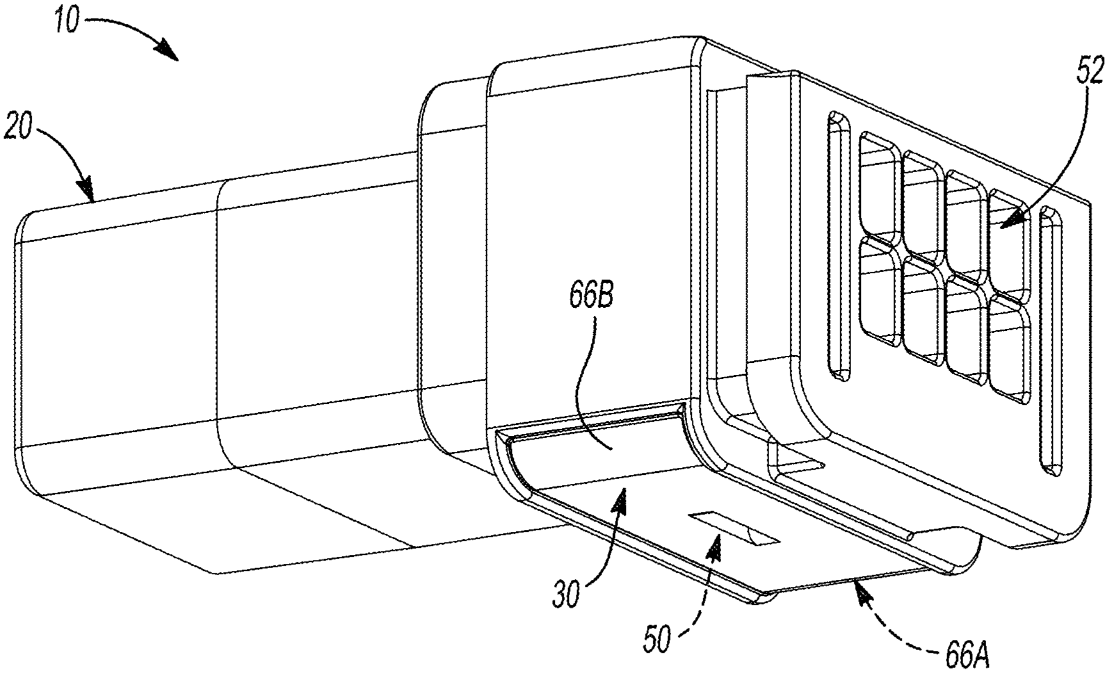
FIG. 1 is a perspective view of a connector assembly in accordance with the principles of the present disclosure.
Figure 2:
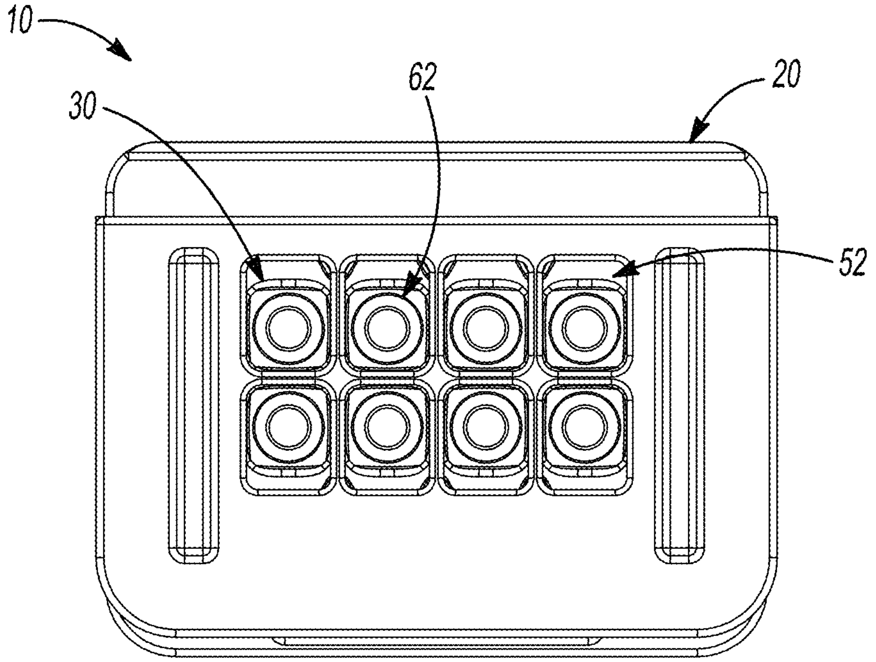
FIG. 2 is a front view of the connector assembly of FIG. 1.

With reference to FIGS. 1, 2, and 7-9, an example connector assembly 10 is shown. As will be explained in more detail below, the connector assembly 10 may be installed in a vehicle (e.g., an automobile) to facilitate the transmission of electricity between various electronic components within the vehicle. For example, the connector assembly 10 may be detachably coupled to a mating connector assembly (not shown), such that, during operation, of the vehicle, electricity is transmitted between the connector assemblies and to various electronic components within the vehicle.

In various implementations, the connector assembly 10 may include a connector body 20, a seal 30, and a plurality of terminals 40, among others. In various implementations, the connector body 20 may define a cavity 50 and a plurality of terminal slots 52. The terminal slots 52 may be in fluid communication with the cavity 50. In various implementations, the seal 30 may be removably disposed within the cavity 50. The seal 30 may include a body 60 defining a plurality of terminal apertures 62. In an assembled configuration, the seal 30 may be disposed in the cavity 50 such that the terminal slots 52 are aligned with the terminal apertures 62. Each terminal 40 may be disposed in a respective terminal slot 52 and a respective terminal aperture 62. As will be explained in more detail below, the seal 30 inhibits contaminants from contacting the terminals 40.

Connector Body

In various implementations, the connector body 20 may comprise one or more of a variety of shapes, sizes, configurations, and/or materials. In various implementations, the connector body 20 connects with the seal 30 and the terminals 40. For example, the cavity 50 of the connector body may receive the seal 30 and each terminal slot 52 may receive a terminal 40. The connector body 20 is shown including one cavity and eight terminal slots, however the connector body 20 may include more than one cavity and more or less than eight terminal slots.

Seal

With reference to FIGS. 3-6, an example seal 30 is shown. In various implementations, the seal 30 may include a body 60, a first rib 64A, a second rib 64B, a third rib 64C, a fourth rib 64D, a first flap 66A, a second flap 66B, a first recess 68A, and a second recess 68B, among others. In various implementations, the body 60 may include a first sidewall 70A, a second sidewall 70B spaced apart from the first sidewall 70A, a third sidewall 70C disposed between the first sidewall 70A and the second sidewall 70B, and a fourth sidewall 70D spaced apart from the third sidewall 70C.

In various implementations, the first rib 64A and/or the third rib 64C may extend from the first sidewall 70A. The second rib 64B and/or the fourth rib 64D may extend from the second sidewall 70B. In various implementations, the first flap 66A may extend from the third sidewall 70C and/or the second flap 66B may extend from the fourth sidewall 70D.

In various implementations, the first rib 64A and/or the third rib 64C may extend continuously and uninterrupted along or about the first sidewall 70A (e.g., along a perimeter of the first sidewall 70A). In some examples, the third rib 64C may be offset from the first rib 64A. The third rib 64C may be disposed inwards relative to the first rib 64A. In various implementations, the second rib 64B and/or the fourth rib 64D may extend continuously and uninterrupted along or about the second sidewall 70B (e.g., along a perimeter of the second sidewall 70B). In some examples, the fourth rib 64D may be offset from the second rib 64B. The fourth rib 64D may be disposed inwards relative to the second rib 64B.

In some example configurations, a rib (e.g., the first rib 64A, the second rib 64B, the third rib 64C, and/or the fourth rib 64D) may define a polygonal-shaped configuration. Alternatively, the rib may define a circular-shaped configuration, an oval-shaped configuration, and/or an oblong-shaped configuration, among others. The seal 30 is shown and is generally described herein as including four ribs, however the seal 30 may include more or less than four ribs.

Figure 5:
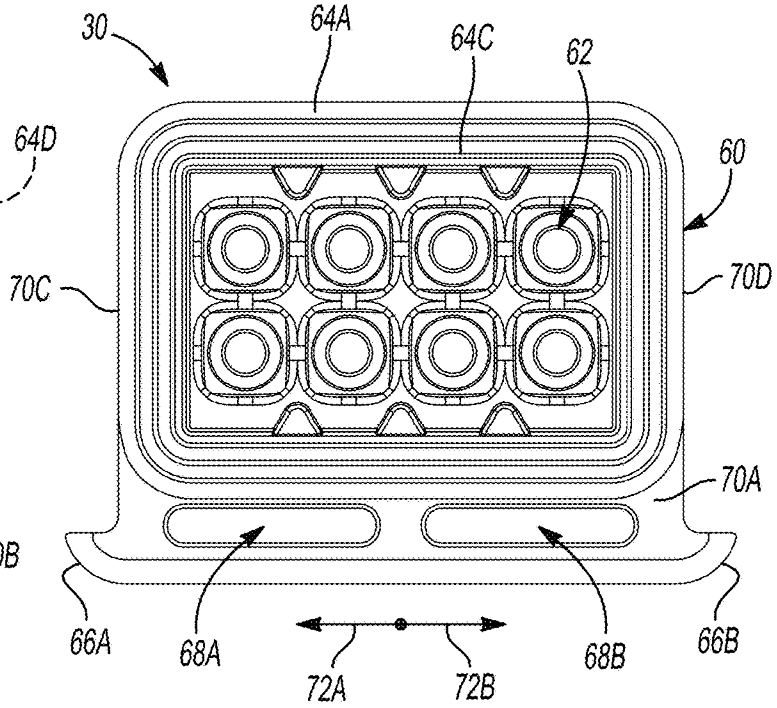
FIG. 5 is a front view of a seal of a connector assembly in accordance with the principles of the present disclosure.
Figure 6:
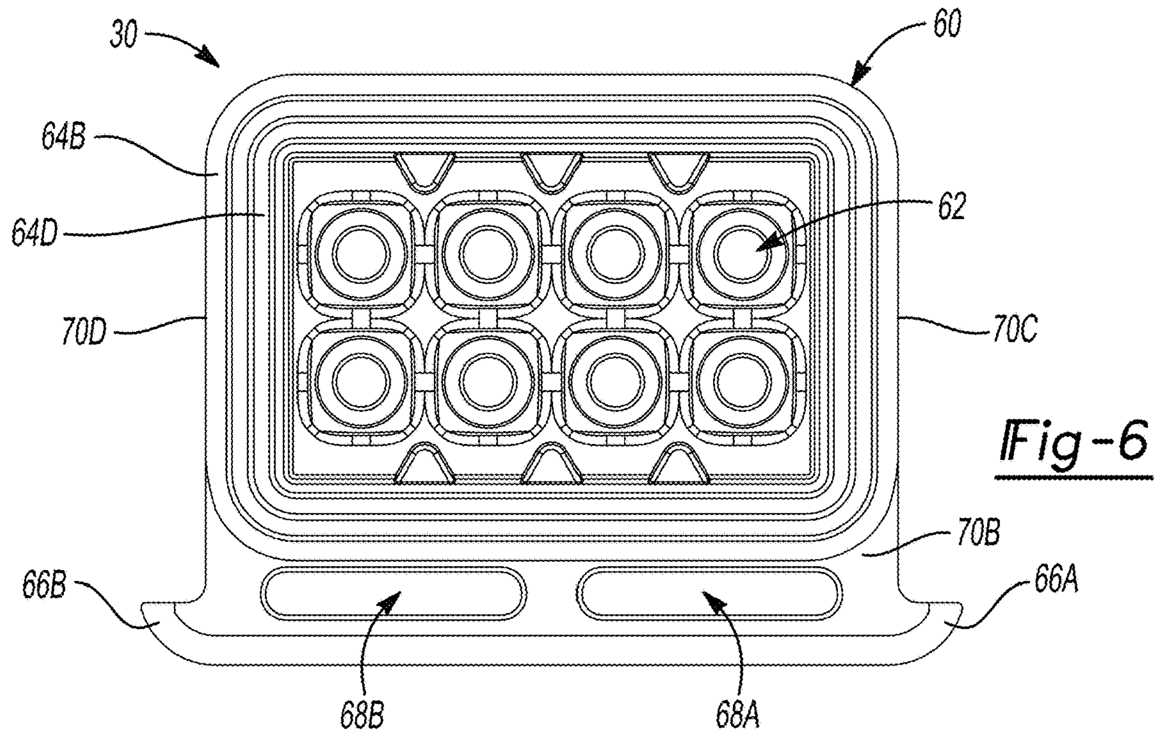
FIG. 6 is a back view of a seal of a connector assembly in accordance with the principles of the present disclosure.
Figure 7:
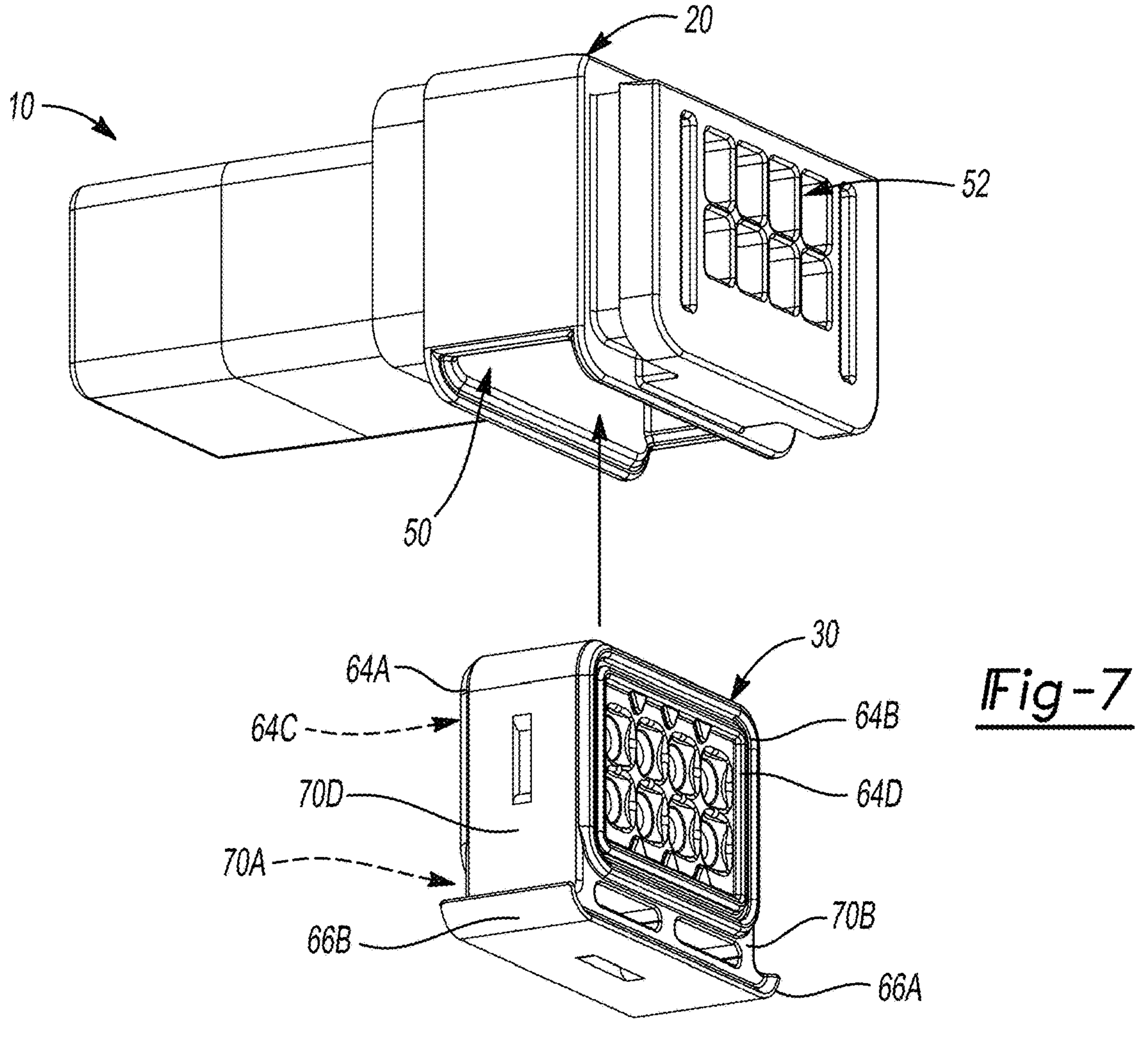
FIG. 7 is an exploded view of a connector assembly in accordance with the principles of the present disclosure.

With reference to FIG. 5, in various implementations, the first flap 66A may extend from the third sidewall 70C in a first direction 72A and the second flap 66B may extend from the fourth sidewall 70D in a second direction 72B that is different than the first direction 72A. In some examples, the second direction 72B may be opposite the first direction 72A. Alternatively, the seal 30 may include a singular flap that extends from the first sidewall 70A, the second sidewall 70B, the third sidewall 70C, and/or the fourth sidewall 70D. The seal is shown and generally described herein as including two flaps, however the seal may include more or less than two flaps.

Figure 3:
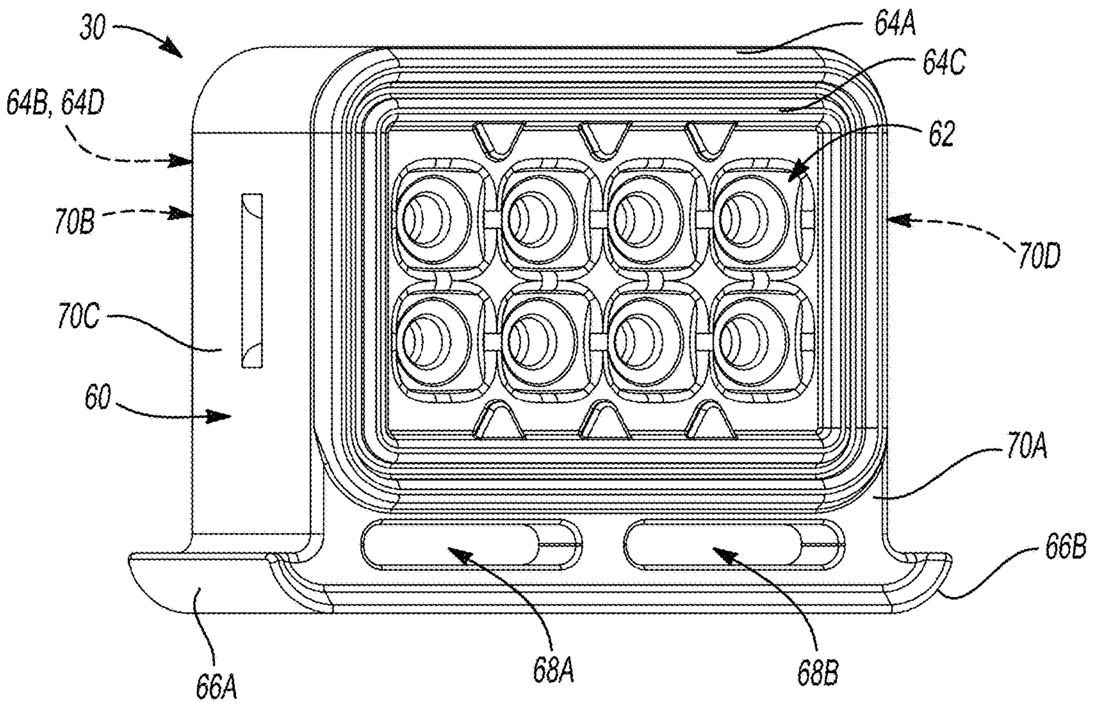
FIG. 3 is a perspective view of a seal of a connector assembly in accordance with the principles of the present disclosure.
Figure 4:
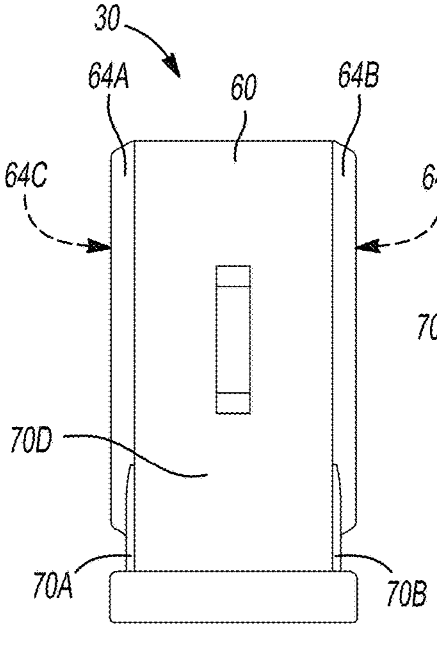
FIG. 4 is a side view of a seal of a connector assembly in accordance with the principles of the present disclosure.

With reference to FIGS. 3 and 5, in various implementations, the first recess 68A and/or the second recess 68B may extend through the body 60, for example, from the first sidewall 70A to the second sidewall 70B. In some examples, thermal expansion of the seal 30 may be reduced via the first recess 68A and/or the second recess 68B. The seal is shown and is generally described herein as including two recesses, however the seal may include more or less than two recesses.

In various implementations, the seal 30 may comprise one or more of a variety of materials. In some examples, the seal 30 may comprise a polymer material such as a rubber and/or a plastic, among others. In various implementations, the seal 30 may be manufactured via a molding process. In various implementations, the seal 30 may include one or more poka-yoke features that may facilitate alignment (e.g., centering, etc.) of the seal 30 in the cavity 50. For example, with reference to FIG. 9, the seal 30 may include at least one projection 74 that extends from the body 60. The projection 74 may engage a portion of the connector body 20 (e.g., inner surface 80B, etc.) to align (e.g., center) the seal 30 in the cavity 50. For example, the projection 74 may engage the inner surface 80B and center the seal 30 in an insertion direction of the seal within the cavity 50. The connector assembly 10 is shown and is generally described herein as including one seal, however the connector assembly 10 may include more than one seal.

Terminals

Figure 9:
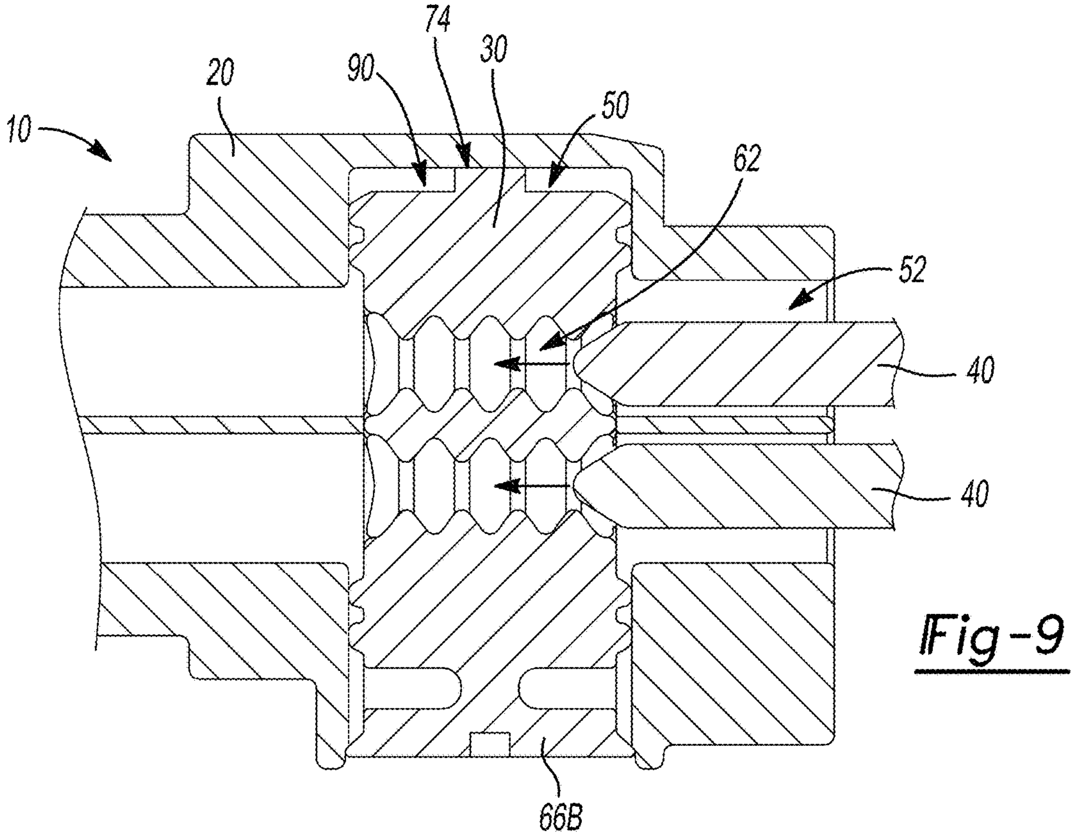

With reference to FIG. 9, each terminal 40 may connect with the connector body 20 and the seal 30. Each terminal 40 may be received by a terminal slot 52 of the connector body 20 and a terminal aperture 62 of the seal 30. Each terminal 40 may connect with one or more electrical wires (not shown). Each terminal 40 may connect with a corresponding terminal of a mating connector (not shown).

Assembled Configuration

With reference to FIGS. 1, 2, 8, and 9, the connector assembly 10 is shown in the assembled configuration. As shown, the seal 30 is disposed within the cavity 50 of the connector body 20. With reference to FIG. 9, at least one terminal 40 is disposed in a terminal slot 52 of the connector body 20 and a terminal aperture 62 of the seal 30. In some example configurations, each terminal slot 52 may include a corrugated configuration. The seal 30 inhibits various contaminants from contacting the terminal 40.

In various implementations, a contaminant may include a fluid (e.g., water, etc.), a substance, an agent, a chemical, and/or a solid, among others. In accordance with the contaminant contacting the terminal 40, the electrical connection of the connector assembly 10 may be negatively impacted. For example, the electrical connection may malfunction or fail (e.g., short circuit), may be susceptible to damage (e.g., corrosion), and/or may pose a safety hazard, among others.

Figure 8:
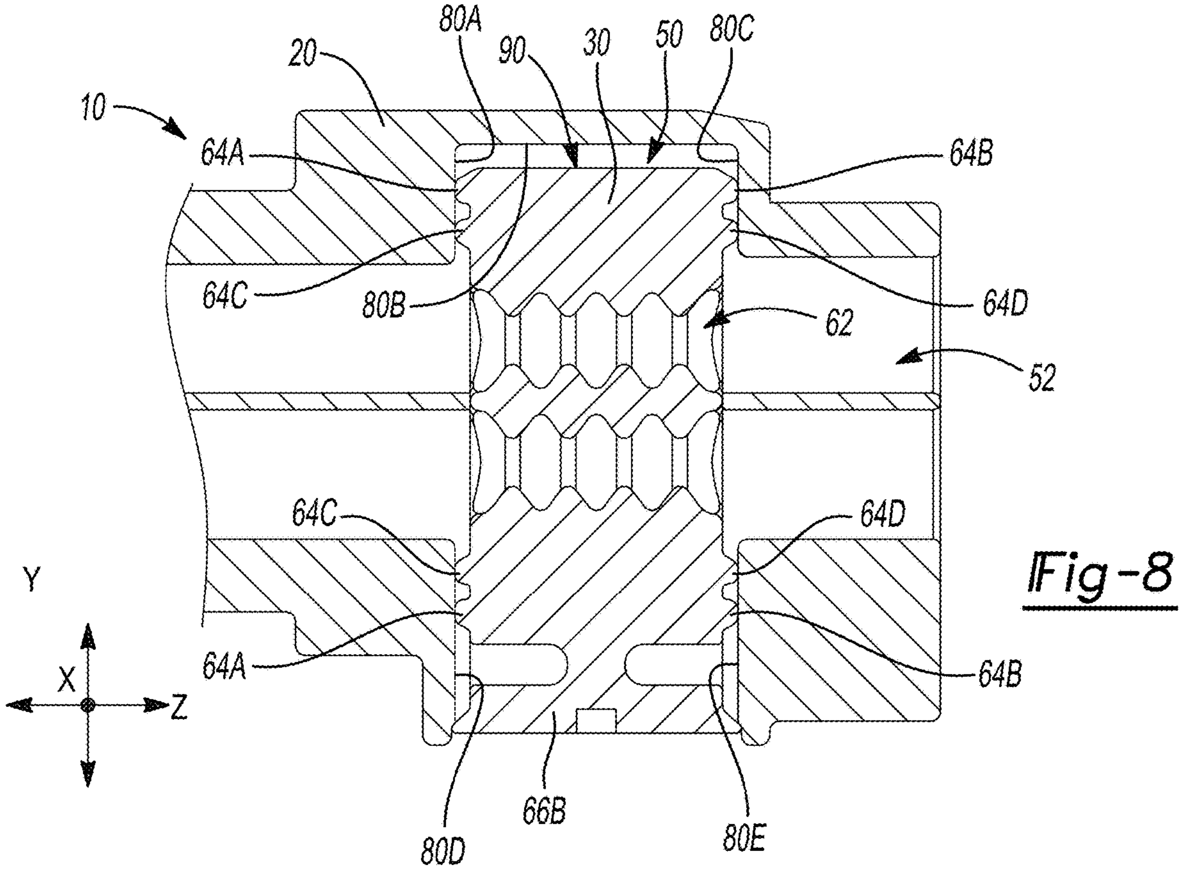
FIGS. 8 and 9 are cross-sectional views of a connector assembly in an assembled configuration in accordance with the principles of the present disclosure.

With reference to FIGS. 8 and 9, in various implementations, one or more inner surfaces (e.g., 80A-80E) of the connector body 20 may define the cavity 50. In the assembled configuration, the first rib 64A and the third rib 64C may engage one or more portions of connector body 20 (e.g., inner surfaces 80A, 80D, etc.). The second rib 64B and the fourth rib 64D may engage one or more additional portions of the connector body 20 (e.g., inner surfaces 80C, 80E, etc.). In some examples, the first rib 64A, the second rib 64B, the third rib 64C, and/or the fourth rib 64D may be inhibit the contaminants from contacting the terminals 40. In various implementations, the first rib 64A and/or the second rib 64B may inhibit removal of the seal 30 from the cavity 50.

In various implementation, the first rib 64A may operate as the primary component for inhibiting the contaminants from contacting the terminals 40. The second rib 64B may operate as the primary component for inhibiting the removal of the seal 30 from the cavity 50. In some examples, the third rib 64C and/or the fourth rib 64D may be operate as redundant and/or secondary components for the first rib 64A and/or the second rib 64B.

With reference to FIGS. 1, 8, and 9, in various implementations, the first flap 66A and the second flap 66B may engage portions of the connector body 20 (e.g., at least inner surfaces 80D and 80E) to inhibit entry the contaminants into the cavity 50. In various implementations, the first flap 66A and/or the second flap 66B may extend in the Z-direction beyond an engagement location between (i) the first, second, third, and/or fourth ribs 64A-64D and (ii) the first, second, third, and/or fourth inner surfaces 80A-80D, respectively, to shield the engagement location(s) from contamination (e.g., a momentum force of contaminants). For example, the first flap 66A and the second flap 66B may shield the engagement location(s) from projectile contaminants. In some example configurations, the first flap 64A and/or the second flap 64B may extend from the body 60 (e.g., in the Z-direction) further than the ribs (e.g., ribs 64A-64D) extend from the body 60 (e.g., in the Z-direction). In various implements, the first rib 64A, the second rib 64B, the third rib 64C, the fourth rib 64D, the first flap 66A, and/or the second flap 66B enable the connector assembly 10 to pass various strenuous tests (e.g., salt spray testing, etc.) that are required for connector assemblies in vehicle applications.

With reference to FIGS. 8 and 9, in various implementations, the seal 30 is disposed within the cavity 50 via a clearance fit. For example, a void 90 may be disposed between a portion of the seal 30 and a portion of the connector body 20 (e.g., at least inner surface 80B). The seal 30 is permitted to expand into the void 90 in accordance with the seal 30 undergoing thermal expansion (e.g., exposed to high temperature, etc.). The clearance fit, for example, the void 90 between the seal 30 and the connector body 20, enables the connector assembly 10 to pass various strenuous tests (e.g., temperature cycle testing, etc.) that are required for connector assemblies in vehicle applications.

Flowchart

Figure 10:
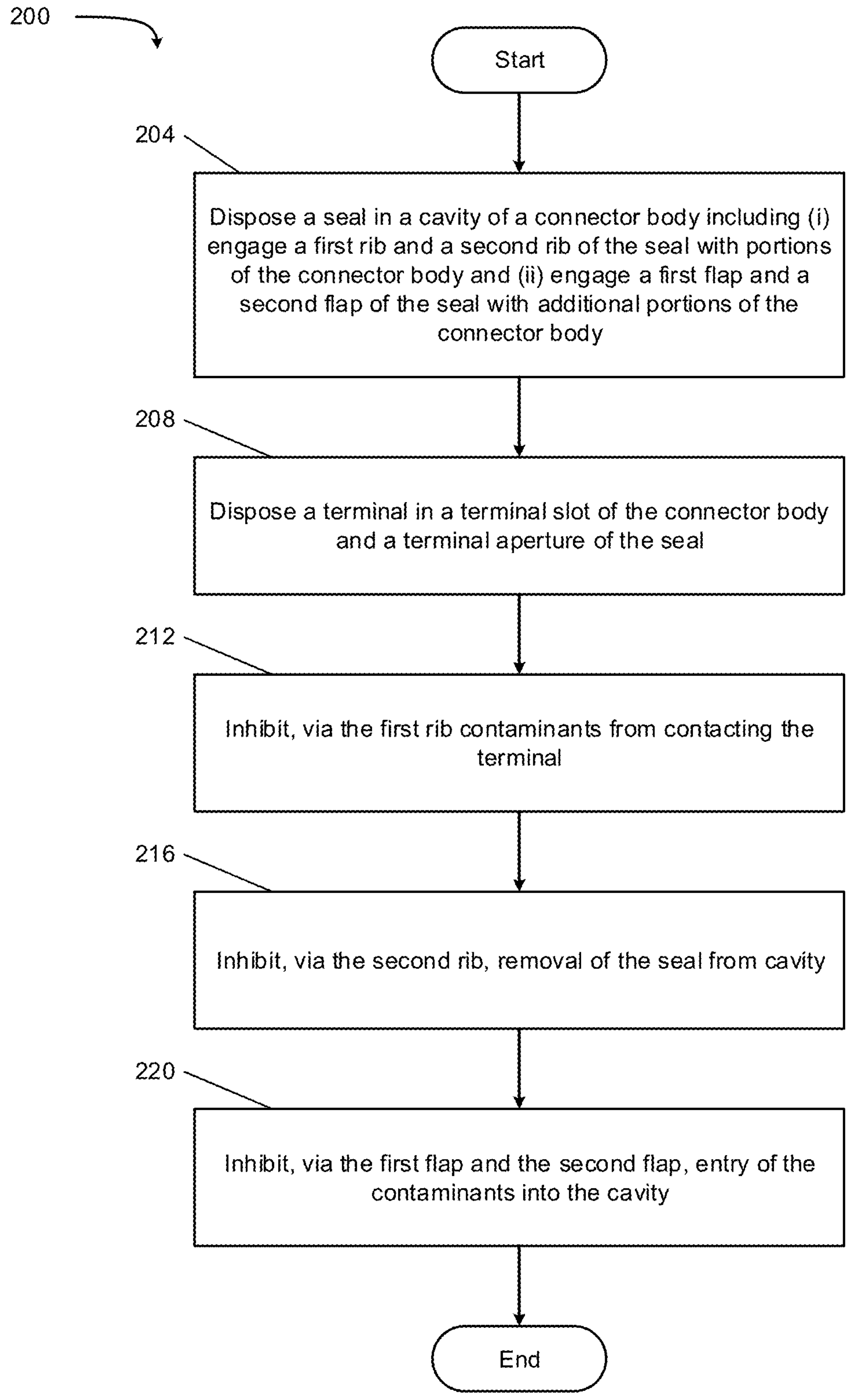
FIG. 10 is a flowchart depicting an example method for assembling a connector assembly and for operating the connector assembly in accordance with the principles of the present disclosure.

FIG. 10 is a flowchart of an example method 200 for assembling and operating an electrical assembly 10. The method 200 may begin at 204. At 204, a user or a machine (e.g., a robot, etc.) may dispose a seal 30 in a cavity 50 of a connector body 20. In some examples, disposing the seal 30 in the cavity 50 includes engaging a first rib 64A, a second rib 64B, a third rib 64C, a fourth rib 64D, a first flap 66A, and/or a second flap 66B of the seal 30 with portions of the connector body 20 (e.g., at least inner surfaces 80A-80E of the connector body 20). The method 200 may proceed to 208.

At 208, the user or the machine may connect a plurality of terminals 40 to the connector body 20 and/or the seal 30. For example, the user or the machine may dispose each terminal 40 in a terminal slot 52 of the connector body 20 and in a corresponding terminal aperture 62 of the seal 30. The method 200 may proceed to 212.

At 212, during operation of the connector assembly 10, the first rib 64A (i.e., the primary sealing rib) may inhibit contaminants from contacting the terminals 40. In some examples, the first rib 64A, the second rib 64B, the third rib 64C, the fourth rib 64D, the first flap 66A, and/or the second flap 66B may inhibit the contaminants from contacting the terminals 40. The method 200 may proceed to 216.

At 216, during operation of the connector assembly 10, the second rib 64B (i.e., the primary assembly rib) may inhibit removal of the seal 30 from the cavity 50. In some examples, the first rib 64A, the second rib 64B, the third rib 64C, and/or the fourth rib 64D may inhibit removal of the seal 30 from the cavity 50. The method 200 may proceed to 220.

At 220, during operation of the connector assembly 10, the first flap 66A and the second flap 66B may inhibit entry of the contaminants into the cavity 50. Then the method 200 may end.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

Spatial and functional relationships between elements (for example, between modules, circuit elements, semiconductor layers, etc.) are described using various terms, including "connected," "engaged," "coupled," "adjacent," "proximate," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The following Clauses provide an exemplary configuration for a connector assembly and related methods, as described above.

Clause 1: A connector assembly comprising: a connector body defining a cavity and a terminal slot in fluid communication with the cavity; and a seal removably disposed within the cavity and including: a body defining a terminal aperture; a first rib and a second rib extending from the body; and a flap extending from the body; wherein, in an assembled configuration, the first rib and the second rib engage portions of the connector body.

Clause 2: The connector assembly of clause 1, wherein: the body of the seal includes: a first sidewall; a second sidewall spaced apart from the first sidewall; and a third sidewall disposed between the first sidewall and the second sidewall; the first rib extends from the first sidewall; the second rib extends from the first sidewall or the second sidewall; and the flap extends from the third sidewall.

Clause 3: The connector assembly of clause 1 or 2, wherein: the first rib extends continuously and uninterrupted along a perimeter of a first sidewall of the body; and the second rib extends continuously and uninterrupted along a perimeter of a second sidewall of the body.

Clause 4: The connector assembly of clause 3, wherein: the terminal aperture extends through the first sidewall and the second sidewall; and the flap extends from the first sidewall and the second sidewall.

Clause 5: The connector assembly of any of clauses 1 through 4, wherein: the first rib is configured to inhibit entry of contaminants into the terminal aperture; and the second rib is configured to inhibit removal of the seal from the cavity.

Clause 6: The connector assembly of any of clauses 1 through 5, wherein, in the assembled configuration: the flap extends from the body of the seal further than the first rib; the flap overlaps a sealing joint between the first rib and an inner surface of the connector body; and the flap engages a portion of the connector body to inhibit entry of contaminants into the cavity.

Clause 7: The connector assembly of any of clauses 1 through 6, wherein, in the assembled configuration, the seal is disposed within the cavity of the connector body via a clearance fit.

Clause 8: The connector assembly of clause 7, wherein: in the assembled configuration, a void is disposed between the seal and at least one inner surface of the connector body; and the seal is permitted to expand into the void when the seal thermally expands.

Clause 9: The connector assembly of any of clauses 1 through 8, wherein: the seal includes at one recess extending through the body; and thermal expansion of the seal is reduced via the recess.

Clause 10: The connector assembly of any of clauses 1 through 9, wherein: the connector body defines a plurality of terminal slots; the body of the seal defines a plurality of terminal apertures; and in the assembled configuration, the seal is disposed in the cavity such that the terminal slots are aligned with the terminal apertures.

Clause 11: A seal for a connector assembly having a connector body, the seal comprising: a body defining a terminal aperture and having a first sidewall, a second sidewall opposite the first sidewall, a third sidewall extending between the first sidewall and the second sidewall, and a fourth sidewall opposite the third sidewall and extending between the first sidewall and the second sidewall; a first rib extending from the first sidewall and configured to engage an inner portion of the connector body; a second rib extending from the first sidewall and configured to engage the inner portion of the connector body; a first flap extending from the third sidewall and configured to engage an outer portion of the connector body; and a second flap extending from the fourth sidewall and configured to engage the outer portion of the connector body.

Clause 12: The seal of clause 11, wherein: the first rib is configured to inhibit entry of contaminants into the terminal aperture; and the seal includes a third rib extending from the body and configured to engage a second inner portion of the connector body to inhibit removal of the seal from the connector body.

Clause 13: The seal of clause 12, wherein: the first rib extends continuously and uninterrupted along a perimeter of the first sidewall of the body; and the third rib extends continuously and uninterrupted along a perimeter of the second sidewall of the body.

Clause 14: The seal of clause 13, wherein the terminal aperture extends through the first sidewall and the second sidewall, and wherein the first flap extends from at least one of the first sidewall and the second sidewall.

Clause 15: The seal of any of clauses 11 through 14, wherein: the first flap extends from the body in a first direction; the second flap extends from the body in a second direction transverse to the first direction; and in an assembled configuration, the flap and the second flap inhibit entry of contaminants into the connector body.

Clause 16: The seal of any of clauses 11 through 15, wherein, in an assembled configuration, the seal is disposed within a cavity of the connector body via a clearance fit.

Clause 17: The seal of clause 16, wherein: in the assembled configuration, a void is disposed between the seal and at least one inner surface of the connector body; and the seal is configured to expand into the void when the seal thermally expands.

Clause 18: The seal of any of clauses 11 through 17, further comprising a projection extending from the body and configured to engage the connector body to align the seal relative to the connector body.

Clause 19: A method comprising: disposing a seal in a cavity of a connector body, including: engaging a first rib and a second rib of the seal with portions of the connector body; and engaging a first flap and a second flap of the seal with additional portions of the connector body; disposing a terminal in a terminal slot of the connector body and a terminal aperture of the seal; and inhibiting, via the first rib, contaminants from contacting the terminal.

Clause 20: The method of clause 19, further comprising: inhibiting, via the second rib, removal of the seal from the cavity; and inhibiting, via the first flap and the second flap, entry of the contaminants into the cavity.

What is claimed is:

1. A connector assembly comprising:
a connector body defining a cavity and a terminal slot in fluid communication with the cavity; and
a seal removably disposed within the cavity and including:
a body including a first sidewall and a second sidewall spaced apart from the first sidewall, the body defining a terminal aperture extending through the first sidewall and the second sidewall;
a first rib and a second rib extending from the body; and
a flap extending from the first sidewall and the second sidewall;
wherein, in an assembled configuration, the first rib and the second rib engage portions of the connector body.

2. The connector assembly of claim 1 wherein:
the body of the seal includes a third sidewall disposed between the first sidewall and the second sidewall;
the first rib extends from the first sidewall;
the second rib extends from the first sidewall or the second sidewall; and
a portion of the flap extends from the third sidewall.

3. The connector assembly of claim 1 wherein:
the first rib extends continuously and uninterrupted along a perimeter of the first sidewall of the body; and
the second rib extends continuously and uninterrupted along a perimeter of the second sidewall of the body.

4. The connector assembly of claim 1 wherein:
the first rib is configured to inhibit entry of contaminants into the terminal aperture; and
the second rib is configured to inhibit removal of the seal from the cavity.

5. The connector assembly of claim 1 wherein, in the assembled configuration, the seal is disposed within the cavity of the connector body via a clearance fit.

6. The connector assembly of claim 5 wherein:
in the assembled configuration, a void is disposed between the seal and at least one inner surface of the connector body; and
the seal is permitted to expand into the void when the seal thermally expands.

7. The connector assembly of claim 1 wherein:
the seal includes at one recess extending through the body; and
thermal expansion of the seal is reduced via the recess.

8. The connector assembly of claim 1 wherein:
the connector body defines a plurality of terminal slots;
the body of the seal defines a plurality of terminal apertures; and
in the assembled configuration, the seal is disposed in the cavity such that the terminal slots are aligned with the terminal apertures.

9. A connector assembly comprising:
a connector body defining a cavity and a terminal slot in fluid communication with the cavity; and
a seal removably disposed within the cavity and including:
a body defining a terminal aperture;
a first rib and a second rib extending from the body; and
a flap extending from the body;
wherein, in an assembled configuration:
the first rib and the second rib engage portions of the connector body;
the flap extends from the body of the seal further than the first rib;
the flap overlaps a sealing joint between the first rib and an inner surface of the connector body; and
the flap engages a portion of the connector body to inhibit entry of contaminants into the cavity.

10. A seal for a connector assembly having a connector body, the seal comprising:
a body defining a terminal aperture and having a first sidewall, a second sidewall opposite the first sidewall, a third sidewall extending between the first sidewall and the second sidewall, and a fourth sidewall opposite the third sidewall and extending between the first sidewall and the second sidewall, wherein the terminal aperture extends through the first sidewall and the second sidewall;
a first rib extending from the first sidewall and configured to engage an inner portion of the connector body;
a second rib extending from the first sidewall and configured to engage the inner portion of the connector body;
a first flap extending from the third sidewall and from at least one of the first sidewall or the second sidewall, the first flap configured to engage an outer portion of the connector body; and
a second flap extending from the fourth sidewall and configured to engage the outer portion of the connector body.

11. The seal of claim 10 wherein:
the first rib is configured to inhibit entry of contaminants into the terminal aperture; and
the seal includes a third rib extending from the body and configured to engage a second inner portion of the connector body to inhibit removal of the seal from the connector body.

12. The seal of claim 11 wherein:
the first rib extends continuously and uninterrupted along a perimeter of the first sidewall of the body; and
the third rib extends continuously and uninterrupted along a perimeter of the second sidewall of the body.

13. The seal of claim 10 wherein:
the first flap extends from the third sidewall in a first direction;
the second flap extends from the fourth sidewall in a second direction transverse to the first direction; and in an assembled configuration, the first flap and the second flap inhibit entry of contaminants into the connector body.

14. The seal of claim 10 wherein, in an assembled configuration, the seal is disposed within a cavity of the connector body via a clearance fit.

15. The seal of claim 14 wherein:

in the assembled configuration, a void is disposed between the seal and at least one inner surface of the connector body; and the seal is configured to expand into the void when the seal thermally expands.

16. The seal of claim 10 further comprising a projection extending from the body and configured to engage the connector body to align the seal relative to the connector body.

17. A method comprising:

disposing a seal in a cavity of a connector body, including:

engaging a first rib and a second rib of the seal with portions of the connector body; and engaging a flap of the seal with additional portions of the connector body, wherein:

the seal includes a body having a first sidewall and a second sidewall spaced apart from the first sidewall, the body defines a terminal aperture extending through the first sidewall and the second sidewall, and the flap extends from the first sidewall and the second sidewall;

disposing a terminal in a terminal slot of the connector body and the terminal aperture of the seal; and inhibiting, via the first rib, contaminants from contacting the terminal.

18. The method of claim 17 further comprising:

inhibiting, via the second rib, removal of the seal from the cavity; and inhibiting, via the flap, entry of the contaminants into the cavity.

* * * * *